Sept. 18, 1923. 1,468,305
W. KUNZE
SENDER DIAPHRAGM FOR SUBMARINE SOUND SIGNALS
Filed Aug. 16, 1921
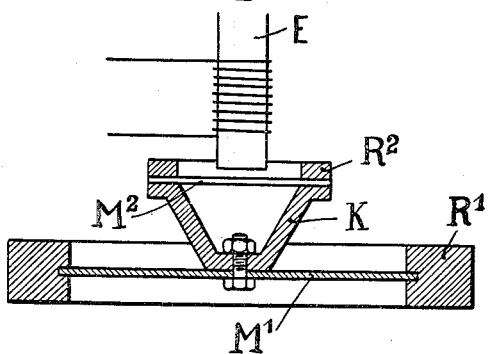
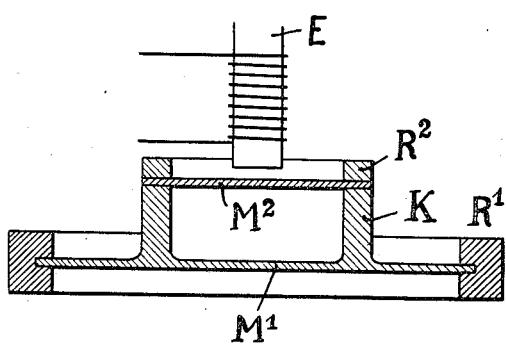

Patented Sept. 18, 1923.

1,468,305

UNITED STATES PATENT OFFICE.

WILLY KUNZE, OF BREMEN, GERMANY.

SENDER DIAPHRAGM FOR SUBMARINE SOUND SIGNALS.

Application filed August 16, 1921. Serial No. 492,754.

*To all whom it may concern:*

Be it known that I, WILLY KUNZE, a citizen of the German Republic, residing at Bremen, Germany, have invented certain new and useful Improvements in Sender Diaphragms for Submarine Sound Signals, of which the following is a specification.

In submarine signaling senders it has been found that electrically-operated diaphragms, whose natural period of vibration corresponds with the frequency of the sound to be sent, have proved the most efficient, as only in such case does the device radiate a maximum of energy. If therefore the pitch of the sound (i. e., the number of vibrations a second) to be sent has been selected, a diaphragm resonant to that pitch must be selected to get the best results.

If the period of vibration of the signalling sound selected is comparatively high, say = 1000, diaphragms will be required which are disproportionately thick and small. With such diaphragms it is however impossible to produce with a given force the same great energy as with large and thin diaphragms. It has therefore been proposed to let the force not act directly upon the diaphragm but upon a second vibratory member coupled with the diaphragm. This second elastic member has to be tuned to the desired sound in taking the coupling into consideration.

This invention relates to a diaphragm sender in which the above mentioned inconvenience is avoided by coupling with the diaphragm which is in contact with the water another vibratory structure, namely: a diaphragm with fixed ring and freely vibrating center.

Whilst for a diaphragm with free edge the natural period of vibration is given by the formula:

$$N = 0.26 \frac{D}{R^2} \sqrt{\frac{E}{\zeta}}$$

D = thickness, R = radius, E = modulus of elasticity, and $\zeta$ = density, the formula $$N = 0.5 \frac{D}{R^2} \sqrt{\frac{E}{\zeta}}$$

applies to the natural period of vibration of a diaphragm clamped in at the rim where N equals such natural period.

From these formulæ it will be seen that when using a diaphragm with a fixed or clamped rim instead of a diaphragm with a free rim, a diaphragm of only half the thickness need be used, thus enabling one to obtain a greater amplitude with a given force.

The object of the invention is shown by way of example in three different forms of construction by the accompanying drawing, wherein:—

Fig. 1 shows the first form of construction.

Fig. 2 the second.

In the first form of construction shown by Fig. 1 the force of the electromagnet E which is produced, for example electromagnetically, acts upon the free center of the diaphragm $M^2$. The rim $R^2$ of the diaphragm is coupled by a rigid conical or funnel-shaped member K with the center of the diaphragm M' clamped in at the edge R'. The effect is thus obtained that the vibrations of larger amplitude of the diaphragm $M^2$ of smaller mass are transformed into vibrations of smaller amplitude of the diaphragm M' of greater mass.

The member K can be cylindrical instead of conical, as shown by Fig. 2, whereby the characteristic of the invention is not altered.

In order to enlarge the range of the resonance the diaphragm M' can be selected so that one of the higher tones coincides with the height of resonance of the internal vibrating system (diaphragm $M^2$).

I claim:—

1. A sender for submarine signaling comprising in combination a diaphragm in contact with water, a second diaphragm of small diameter clamped at its rim, means for rigidly connecting the center of the first-named diaphragm with the clamped rim of the smaller diaphragm, and means for vibrating the smaller diaphragm.

2. A sender for submarine signaling comprising in combination a diaphragm in contact with water, a second diaphragm of smaller diameter clamped at its rim, the two diaphragms having a predetermined pitch with relation to each other, means for rigidly connecting the center of the first-named diaphragm and the clamped rim of the smaller diaphragm, and means for vibrating the smaller diaphragm.

3. A sender for submarine signaling comprising in combination a diaphragm in contact with water, a second diaphragm of smaller diameter clamped at its rim, a rigid funnel-shaped member connecting the center of the first-named diaphragm and the clamped rim of the smaller diaphragm, and means for vibrating the smaller diaphragm.

4. A sender for submarine signaling comprising in combination a diaphragm in contact with water, a second diaphragm of smaller diameter clamped at its rim, means for rigidly connecting said first-named diaphragm and the clamped rim of the smaller diaphragm, and means for vibrating the smaller diaphragm.

In testimony whereof I affix my signature.

Dr. WILLY KUNZE.